United States Patent [19]
Herscovici et al.

[11] B 3,982,599
[45] Sept. 28, 1976

[54] TRACTOR HAVING TRANSMISSION-DRIVEN POWER TAKE-OFF

[75] Inventors: Saul Herscovici, Waterloo; Lawrence Vernon Anderson, Cedar Falls, both of Iowa

[73] Assignee: Deere & Company, Moline, Ill.

[22] Filed: Feb. 21, 1975

[21] Appl. No.: 551,527

[44] Published under the second Trial Voluntary Protest Program on January 13, 1976 as document No. B 551,527.

[52] U.S. Cl. ............................ 180/53 R; 74/740
[51] Int. Cl.² ............................ B60K 17/28
[58] Field of Search ............... 180/51, 53 R; 74/740

[56] References Cited
UNITED STATES PATENTS

| | | | |
|---|---|---|---|
| 3,701,393 | 10/1972 | Lemons et al. | 180/51 |
| 3,774,460 | 11/1973 | Browning et al. | 74/740 X |
| 3,774,474 | 11/1973 | Recker et al. | 74/740 |
| 3,774,475 | 11/1973 | Meysenburg et al. | 74/740 |

*Primary Examiner*—M. H. Wood, Jr.
*Assistant Examiner*—Terrance L. Siemens

[57] ABSTRACT

A four-wheel drive tractor with front and rear frame structures joined for articulation about a generally upright pivot has a split change speed-transmission. The first section of the transmission is supported on the front frame structure of the tractor and provides direct drive and overdrive speed ratios. A second section of the transmission is supported on the rear frame structure of the tractor and has a plurality of forward and reverse transfer ratios. A power take-off on the rear frame structure of the tractor is driven by the drive between the first and second sections of the transmission and includes selectively engageable and disengageable clutch means. An interlock between the clutch means and the first section of the transmission shifts the first section of the transmission to and/or holds the first section of the transmission in its direct drive condition whenever the PTO clutch is engaged. In this manner damage to any PTO driven implement coupled to the tractor as a result of overspeed is avoided.

8 Claims, 8 Drawing Figures

3,982,599

TRACTOR HAVING TRANSMISSION-DRIVEN POWER TAKE-OFF

BACKGROUND OF THE INVENTION

The present invention relates generally to tractor transmission and power take-off arrangements, and more particularly relates to improved controls for a transmission-driven power take-off (hereinafter referred to as PTO).

In order to make PTO driven implements manufactured by one company compatible with tractor manufactured by another, standards have been established which specify standard PTO speeds. In order to comply with these standards, it has been common practice for tractor manufacturers to have engine driven PTOs so that the PTO speed is not affected by variations in the transmission ratio of the main drive train. However, the requirement of having an engine driven PTO will, in some situations, add to the cost of the tractor or restrict design possibilities. For example, in an articulated tractor with a front engine and rear PTO, an engine driven or live PTO will require either an extra shaft crossing the axis of articulation or will require the entire drive transmission to be located on the rear frame structure of the tractor. In some situations, where economy is of importance, it may be desirable to avoid having a PTO drive shaft extend across the axis of articulation of an articulated tractor and at the same time it may be desirable to have at least a portion of the transmission located on the front frame structure of the articulated tractor.

SUMMARY OF THE INVENTION

The general object of the present invention is to provide a tractor having a transmission-driven PTO in which an interlock between the transmission and PTO controls automatically conditions the transmission to drive the PTO at a proper speed whenever the PTO is engaged.

According to a preferred embodiment of the invention, an articulated tractor is provided with a two section transmission, one section of the transmission being located forward of the axis of articulation of a tractor and the second section of the transmission being located rearwardly of the axis of articulation of the tractor, a power take-off located on the rear section of the tractor and driven by the drive train between the first and second sections of the transmission, and an interlock between the PTO controls and the controls for the first section of the transmission which automatically conditions the first section of the transmission to a direct drive ratio whenever the power take-off is engaged.

The above and additional objects and advantages will become apparent to those skilled in the art from a reading of the following detailed description when taken in conjunction with accompanying drawings.

BRIEF DESCRIPTION OF THE DRAWINGS

In the drawings:

FIG. 4 is a sectional view taken substantially along the lines 4—4 of FIG. 2a.

DESCRIPTION OF THE PREFERRED EMBODIMENT

Figure 1:
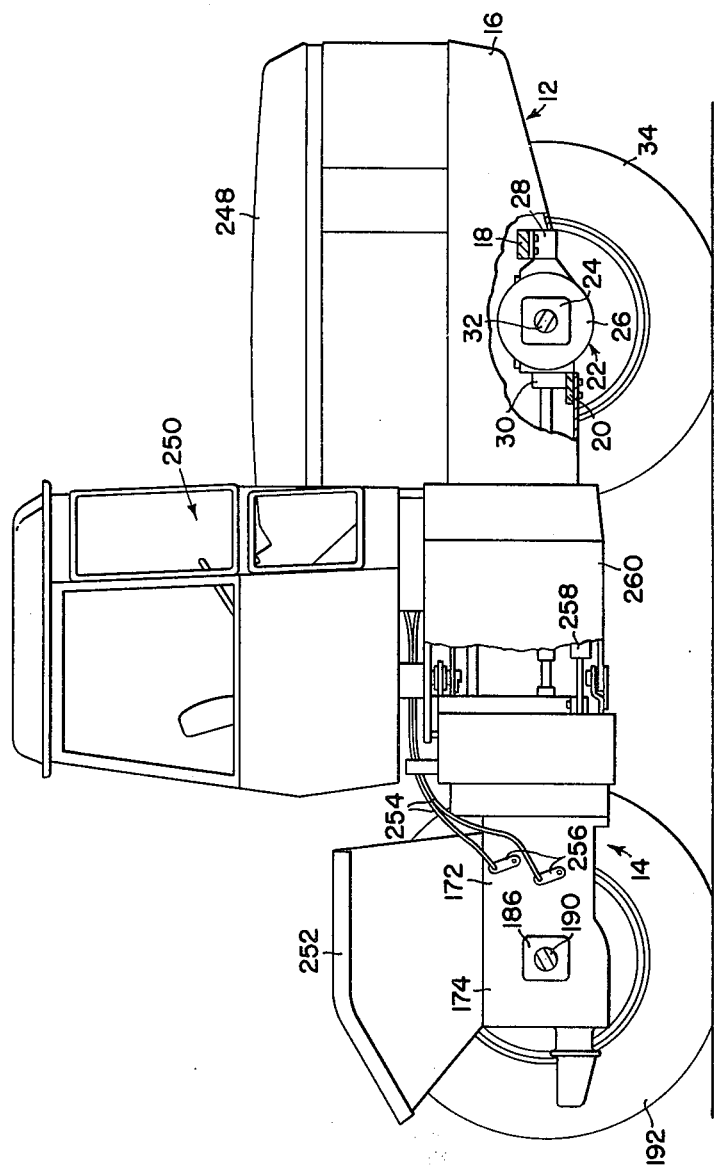
FIG. 1 is a side elevational view of a tractor embodying the invention, portions of the tractor being broken away for clarity of illustration.
Figure 2A:
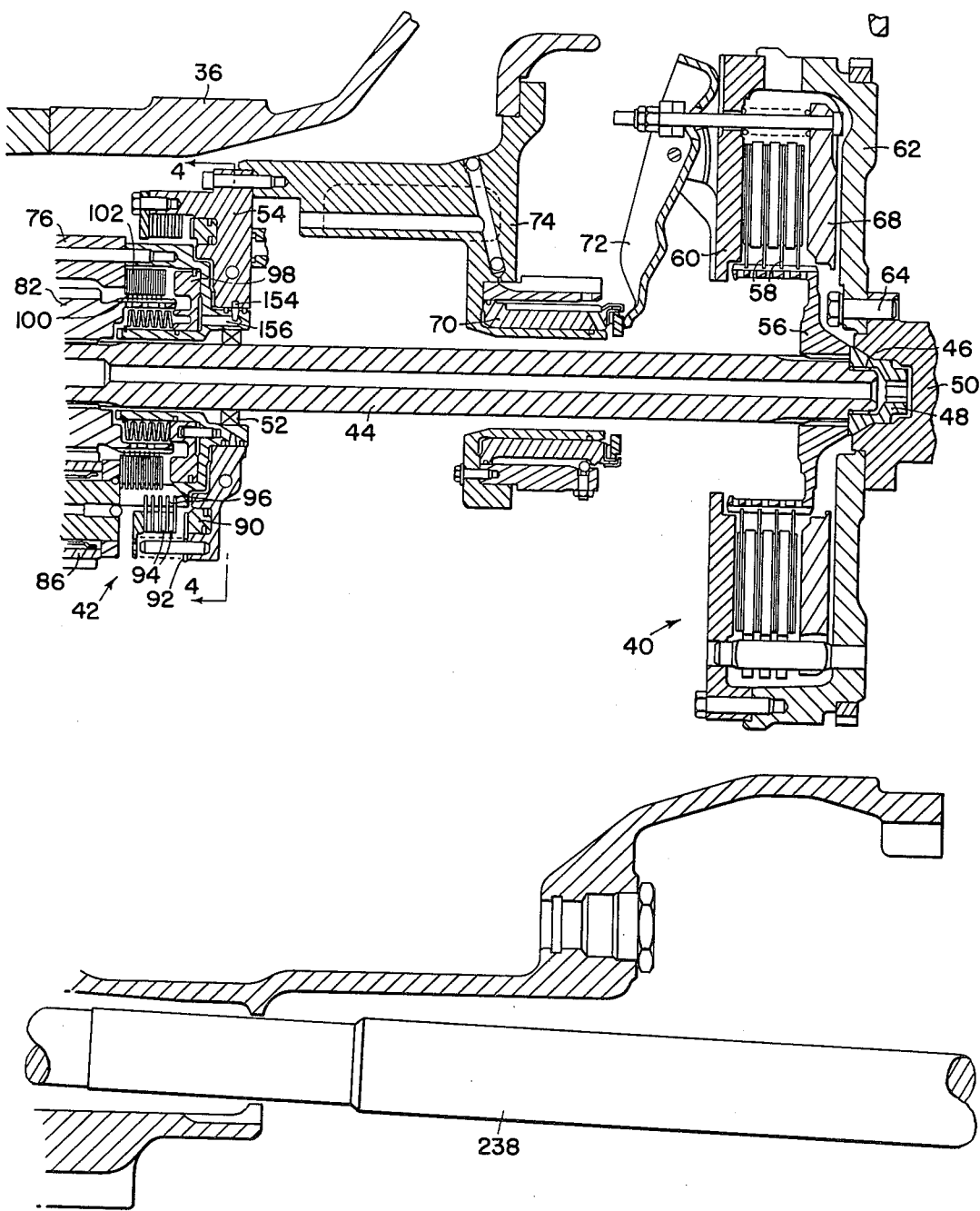
FIGS. 2a through 2d are, when placed side by side in alphabetical order, with FIG. 2a to the right, a fore-and-aft vertical section to the center of a tractor drive train.
Figure 2B:
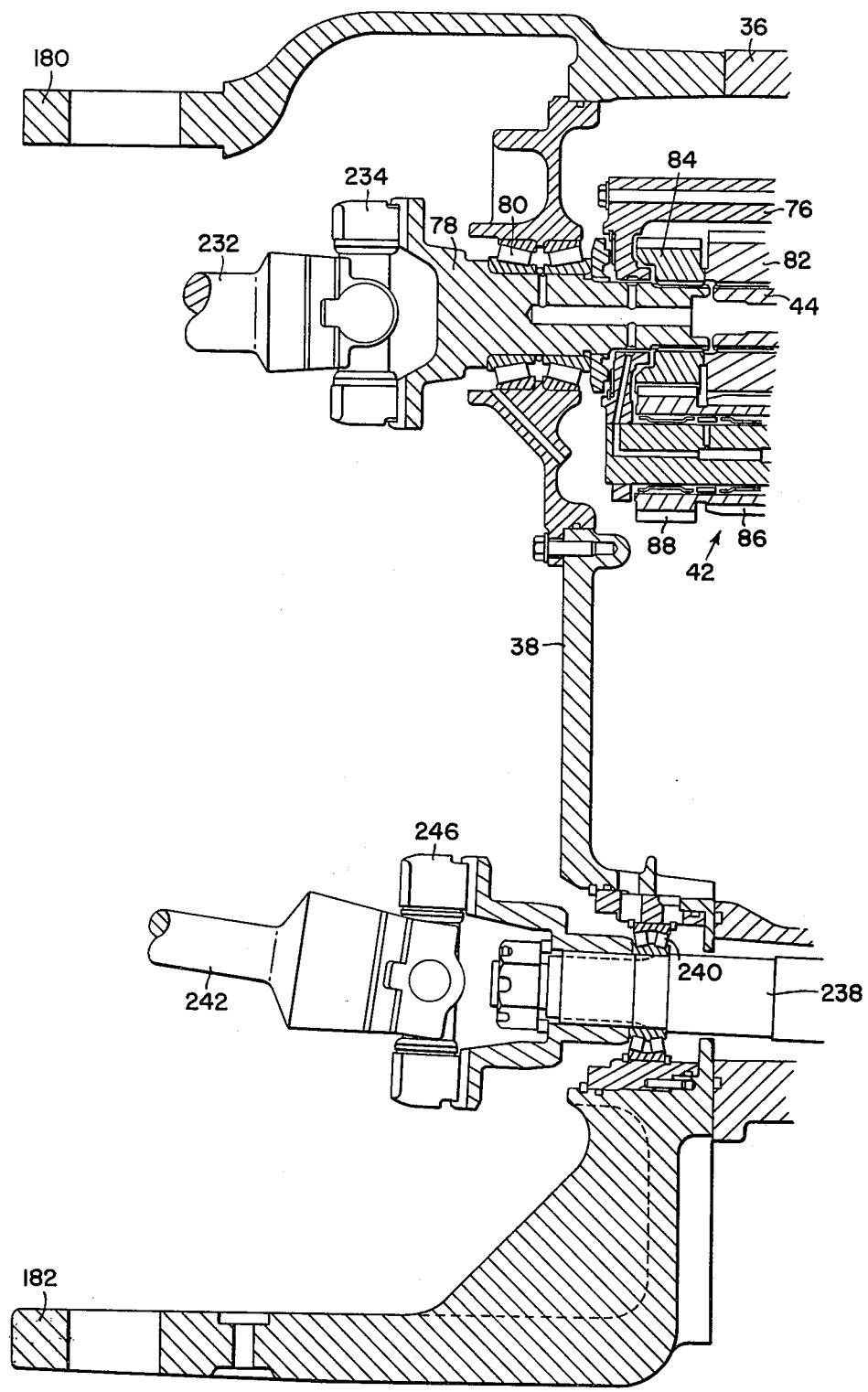
Figure 2C:
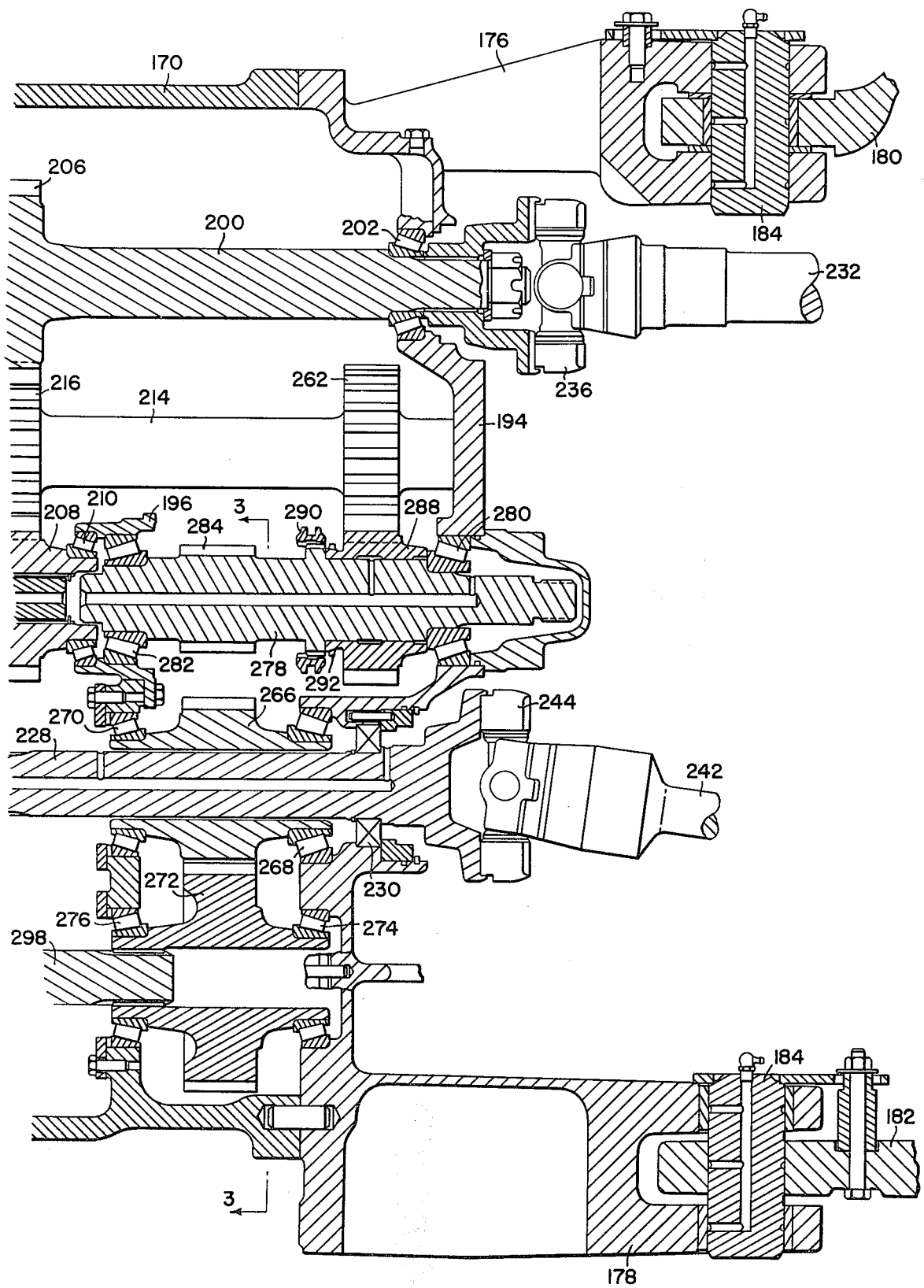
Figure 2D:
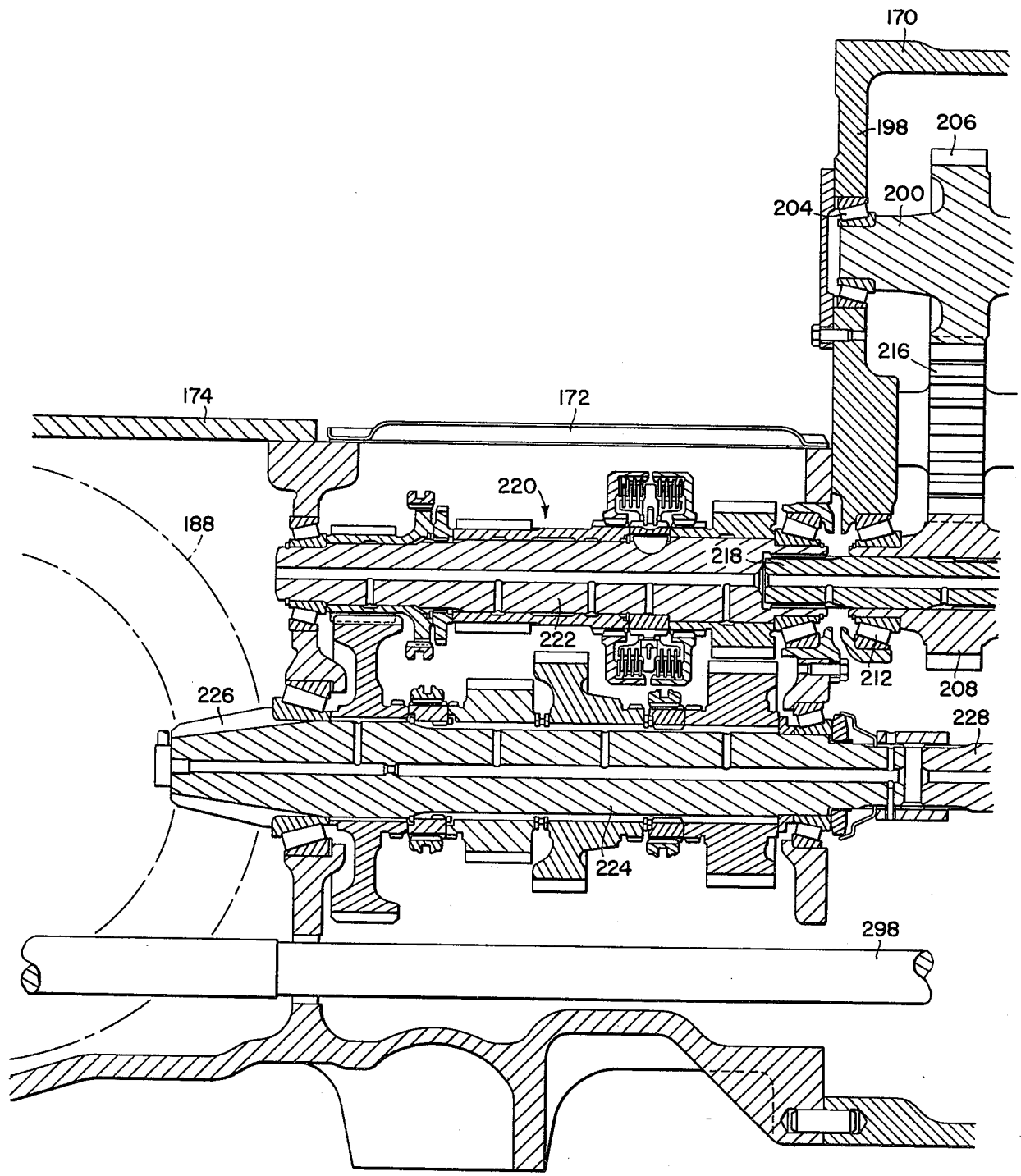

The invention is embodied in a four-wheel articulated tractor having an articulated main frame formed by pivotally interconnected front and rear frame structures 12 and 14, respectively. The front frame structure includes a pair of fore-and-aft elongated beams 16 and a pair of transverse beams 18 and 20 which rigidly interconnect the beams 16. A front axle assembly indicated generally at 22 supports the front frame structure and includes a pair of axle housings 24 extending transversely from opposite sides of a differential housing 26 which is pivotally mounted on the transverse beams 18 and 20 by pivot brackets 28 and 30, respectively. The front axle structure 22 is free to oscillate with respect to the front frame structure about a fore-and-aft axis extending through the pivot brackets 28 and 30. As is conventional, differential gearing is contained within the differential housing 26 and drives a pair of front drive axles 32 which drive front wheels 34.

The front frame structure also includes or supports a transmission housing 36 which has a rear wall 38 and a forward end adapted to be connected to the block of an engine which is supported by the front frame structure above the front axle assembly. The transmission housing contains a main traction clutch indicated generally at 40 and a first section 42 of a speed change transmission.

A traction input shaft 44 extends axially within the transmission housing 36 and has its right end supported by bearings 46 located within a bushing 48 which is affixed within an opening extending axially into the end of the engine crankshaft shown partially at 50. An intermediate portion of the traction input shaft is supported by bearings 52 in a support member 54 carried in the housing 36.

The traction clutch 40 includes a hub 56 splined to the traction input shaft and carrying annular, axially shiftable friction element 58. A clutch backing plate 60 is fixed to the rim of a flywheel 62 which in turn is fixed to the engine crankshaft 50 by bolts 64. A pressure plate 68 is mounted between the flywheel 62 and friction elements 58 and, as is conventional, is mounted for rotation with the flywheel 62 as well as for axial movement toward and away from the friction element 58 to frictionally engage the latter with the backing plate 60. Actuating means for the traction clutch includes an annular hydraulic piston 70 which is in concentric relationship to the input shaft 44, which engages the inner end of a set of radially extending clutch operating fingers 72 (only one of which is shown), and which is mounted in the wall 74 supported by the housing 36. When fluid pressure is applied to the left end of the piston 70 it shifts to the right against the inner ends of the clutch operating fingers 72 to engage the traction clutch and establish a driving relationship between the engine crankshaft 50 and the traction input shaft 44.

The first transmission section 42 is a direct drive-overdrive planetary transmission which includes a carrier 76 which has its right end supported by the member 54. The left end of the carrier 76 is supported on an output shaft 78 which in turn is supported in the wall 38 by bearings 80. The traction input shaft 44 extends into the carrier 76 and has a sun gear 82 splined to its extreme left end. A sun gear 84 is splined to the extreme right end of the output shaft 78. A planet cluster gear is rotatably mounted on the carrier 76 and includes integral gears 86 and 88 respectively meshed with the sun gears 82 and 84.

An annular brake actuating piston 90 is axially shiftably mounted in the support member 54 for movement toward the planet carrier 76 to move an annular pressure plate 92, also axially shiftably mounted on a support member 54, to bring friction elements 94 carried by the support member 54 into braking engagement with friction elements 96 carried by the carrier 76. Thus, actuation of the piston 90 causes the carrier 76 to be braked against rotaion resulting in a condition where the power flows from the input shaft 44 to the input sun gear 88, to the planet cluster, through sun gear 84 and out the output shaft 78. It should be noted that the planetary gearing is chosen such that the above-described condition of the planetary transmission section results in an overdrive situation wherein the output shaft 78 is driven at a higher rotational speed than the input shaft 44.

An annular clutch actuating piston 98 is axially shiftably mounted in the carrier 76 for movement toward and for causing engagement among friction elements 100 carried by the input sun gear 82 and friction elements 102 carried by the carrier 76. Thus, actuation of the piston 98 causes the carrier to be locked to the input sun gear 82 so the planetary transmission section is locked and the output shaft 78 is driven at the same speed as the input shaft 82.

Figure 4:
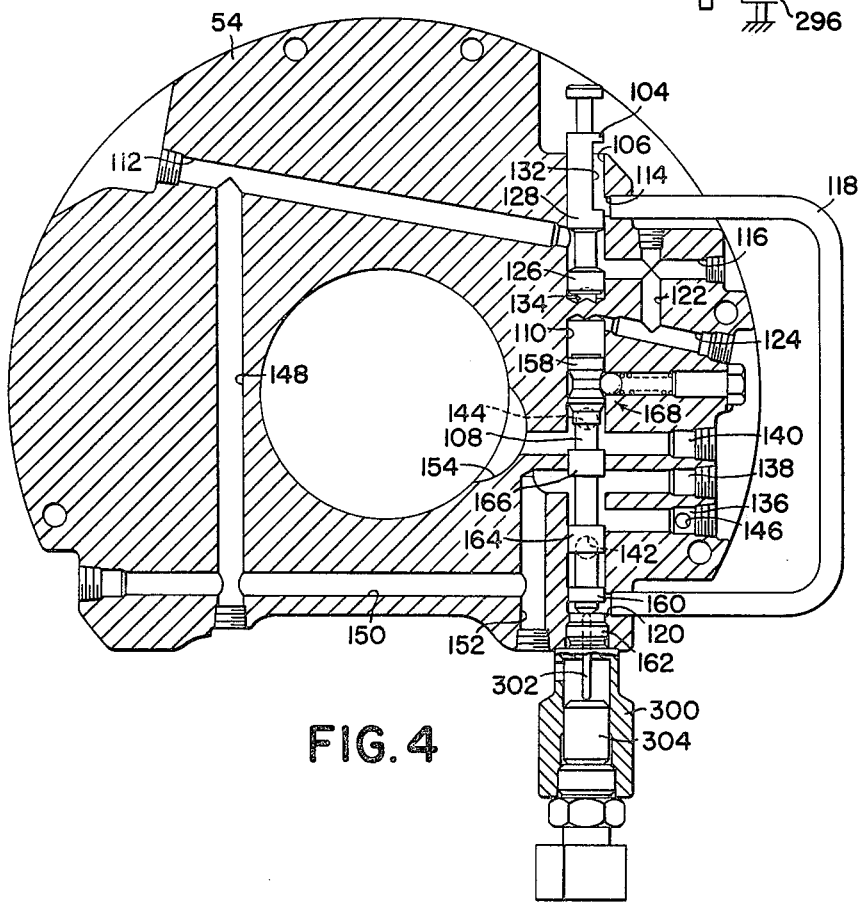

The controls for the brake piston 90 and clutch piston 98 are illustrated in FIG. 4 and include a manually controlled two-position valve element 104 slidably mounted in a first bore 106 provided in the support member 54 and a two-position pressure responsive valve element 108 slidably mounted in a second bore 110 provided in the support member 54. The bore 106 is intersected by three passageways 112, 114, and 116. The passageway 112 is connected to any suitable source of fluid pressure such as a variable displacement pump 113 (see FIG. 5), the passage 114 is in communication via a conduit 118 with a passage 120 which communicates with the bore 110 adjacent the outer end thereof, and the passage 116 communicates with the inner end of the bore 110 via passageways 122 and 124. The valve element 104 is provided with lands 126 and 128 which are spaced apart a distance equal to the spacing between the passages 114 and 116, and which are positioned on opposite sides of the passage 112. When the valve element 104 is manually moved to its inner, illustrated position the spooling groove between the lands 126 and 128 provide communication between the passages 112 and 116 so that the fluid pressure from the passage 112 is free to pass through the passages 116, 122 and 124 to the inner end of the bore 110. Also, when the valve element 104 is in its inner position the outer end of the bore 110 is in communication with a fluid reservoir 130, preferably formed by the transmission housing 36, via the passage 120, conduit 118, passage 114, and a notched area 132 provided in the land 128 of the valve element 104. When the valve element 104 is manually moved to its outer position the spooling groove between the lands 126 and 128 provide communication between passages 112 and 114 so that the outer area of the bore 110 is pressurized and the inner end of the bore 110 is in communication with the reservoir 130 via passages 124, 122, 116, the bore 106 and a passage 134 which communicates with the bore 106 at the inner end thereof.

In addition to the passages 120 and 124, the bore 110 is intersected by passages 136, 138, 140, 142 and 144. The passage 136 is in communication with the back side of the brake piston 90 by a passage 146, the passage 138 is in communication with the passage 122 via passages 148, 150 and 152, the passage 140 is in communication with the back sides of the clutch piston 98 via a milled slot 154 and a passage 156 in the carrier element 76, and the passages 142 and 144 are in communication with the reservoir 130. The valve element 108 is provided with a land 158 at its inner end which, in cooperation with the closed inner end of the bore 110 forms a first servo chamber. The valve element 108 is also provided with a land 160 near its outer end which, in cooperation with a plug 162 in the outer end of the bore 110 forms a second servo chamber. Valve element 108 is further provided with a pair of spaced intermediate lands 164 and 166 which, when the valve element 108 is in its inner and outer positions, provide communication between passage 138 and passages 140 and 136 respectively. It should be noted that the passages 142 and 144 are positioned such that when the passages 138 and 140 are in communication the passage 136 is in communication with passage 142 and, when the passages 138 and 136 are in communication, the passage 140 is in communication with passage 144. A spring pressed ball detent indicated generally at 168 cooperates with the valve element 108 to hold it in its inner and outer positions.

From the foregoing it can be seen that when the valve element 104 is manually moved to its inner position the servo chamber at the inner end of the bore 110 is pressurized and shifts the valve element 108 downwardly so that fluid pressure is supplied to the inner end of the brake piston 90 and the pressure at the inner end of the clutch piston 98 is exhausted to the reservoir. When the valve element 104 is mainly moved to its outer position the servo chamber at the outer end of the bore 110 is pressurized and moves the valve element 108 to its inner position so that fluid pressure is supplied to the inner end of the clutch piston 98 and fluid pressure at the inner end of the brake piston 90 is exhausted to the reservoir.

The rear frame structure of the vehicle consists essentially of a housing 170 of a gearbox, a housing 172 of a second or rear change-speed transmission section, and a differential housing 174. A pair of upper and lower pivot arms 176 and 178 extend forwardly from the gearbox housing 170 to forked outer ends which receive upper and lower pivot arms 180 and 182 extending rearwardly from the front frame structure. The forked forward ends of the pivot arms 176 and 178 and the rear ends of the pivot arms 180 and 182 are apertured and receive pivot pins 184 which articulately interconnect the front and rear frame structures.

The rear frame structure is supported by the rear axle assembly which includes the differential housing 174 and oppositely extending axle housings 186. As is conventional, differential gearing 188 is contained within the differential housing and is in driving engagement with axles 190 which drive the rear wheels 192.

The gearbox housing 170 includes a front wall 194, an intermediate wall 196 and a rear wall 198. The gearbox housing contains an upper input shaft 200 which is rotatably supported on the walls 194 and 198 by bearings 202 and 204, respectively, and which includes an integral drive gear 206. Directly below the input shaft 200, the hubs of a gear 208 are rotatably supported in the walls 196 and 198 by bearings 210 and 212. A jack shaft 214 is also rotatably supported by the walls 194 and 198 and includes an integral gear 216 in mesh with the gears 206 and 208 to transmit rotation of the input shaft 200 to the gear 208. A gearbox output shaft 218 is keyed to and carried by the gear 208 and extends through the wall 198 to the second speed change transmission section.

The second speed change transmission section, indicated in its entirety by the numeral 220 is of conventional construction and is currently used on many of the tractors produced by the applicant's assignee and therefore will not be described in detail. However, for a full description of the same, reference can be had to U.S. Pat. No. 2,772,652 which issued on Dec. 4, 1956 to W. H. DuShane et al. Suffice it to say that the transmission 220 includes fore-and-aft extending input and output shafts 222 and 224, respectively. The input shaft 222 is coupled to the gearbox output shaft 218 and the rear end of the output shaft 224 is provided with a bevel gear 226 which drives the differential gear 188. The forward end of the output shaft 224 of the rear transmission section extends into the gearbox where it is connected to a transfer shaft 228 which has its forward end supported by the gearbox front wall 194 by bearing 230.

To complete the drive train of the vehicle, a main drive shaft 232 is coupled between the first speed change transmission section output shaft 78 and the gearbox input shaft 200 by front and rear universal joints 234 and 236 which are spaced equal distances from the axis of articulation between the front and rear frame structures. Power to the front wheels is delivered through a shaft 238 which has its rear portion journaled in the rear wall 38 of the transmission housing 36 by bearings 240 and its forward end extending into the differential housing 26 where it is provided with a bevel gear which meshes with conventional differential gears, and a lower driveshaft 242 which is coupled between the transfer shaft 228 and the shaft 238 by rear and front universal joints 244 and 246 which are spaced equal distances from the axis of articulation between the front and rear frame structures.

To complete the overall tractor with the exception of the PTO, a front hood structure 248 is positioned over the engine, an operator's station 250 is mounted on the front frame structure directly behind the front hood structure, and a pair of fenders 252 for the rear drive wheels are mounted on the rear frame structure. Suitable controls in the form of Bowden cables 254 extend from the operator's station to control levers 256 for the rear change-speed transmission section 220. The tractor is steered by extending and retracting hydraulic cylinders 258 connected between the front and rear frame structures on opposite sides of the axis of articulation, as is well known. A pair of fuel tanks 260 are mounted on opposite sides of the front frame structure outwardly of the pivots 184.

In the operation of the tractor thus far described, the operator controls the speed of the tractor by varying the transfer ratios of the front and rear transmission sections 42 and 220, respectively. The front speed change transmission section can be conditioned for direct drive or overdrive and within each of these ratios the rear transmission section can be conditioned for any one of a plurality of forward and reverse speed ratios.

Figure 3:
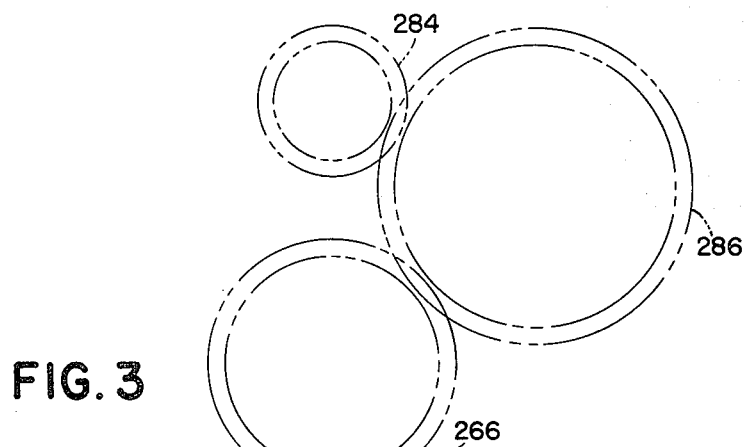
FIG. 3 is a schematic illustration of a sectional view taken substantially along the lines 3—3 of FIG. 2c.

A power take-off drive is contained within the gearbox 170 and includes a first gear 262 which is integral with the jack shaft 214, and axially bored gear 266 which surrounds the gearbox transfer shaft 228 and is supported on the gearbox walls 194 and 196 by bearings 268 and 270, and an axially bored PTO shaft drive gear 272 which is supported by bearings 274 and 276 in the walls 194 and 196 and meshes with the gear 266. A first PTO jack shaft 278 is supported in the gearbox walls 194 and 196 by bearings 280 and 282 and includes an integral gear 284. A second PTO jack shaft (not shown) is also supported in the walls 194 and 196 and includes a gear 286 (see FIG. 3) which is in mesh with the gears 284 and 266. An additional gear 288 is journaled on the jack shaft 278 and a clutch element 290 keyed to the jack shaft 278 is shiftable axially to engage teeth 292 on the hub of the gear 288 to couple the gear 288 to the jack shaft 278. The clutch element 290 is controlled by any suitable shifter fork (not disclosed) controlled by any suitable means such as a lever 294 which is interconnected with the shift fork through a Bowden cable 296 (see FIG. 5). The power take-off shaft 298 has its forward end extending into and splined to the gear 272 and it extends rearwardly through the transmission housing 172 and differential housing 174 to the rear of the tractor.

Figure 5:
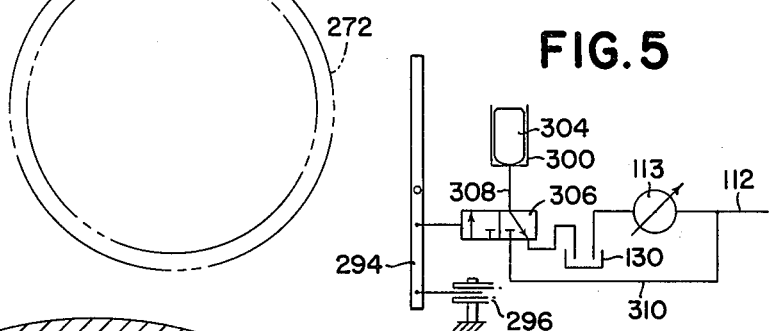
FIG. 5 is a schematic representation of the interlock between the PTO and transmission controls.

An interlock between the controls for the PTO clutch and the controls for the first section of the change-speed transmission is illustrated in FIGS. 4 and 5 and include a cylinder 300 which may be integral with the plug 162. A pin or rod 302 is reciprocally mounted in an opening provided in the plug 162 and projects into the bore 110 for engagement with the valve element 108. A piston 304 is reciprocally mounted in the cylinder 300 and has its inner end in engagement with the rod 302. The cylinder 300 is connected to one side of a two-position three-way valve 306 whose movement between its two positions is controlled by the lever 294. When the lever 294 is adjusted to disconnect the clutch element 290 from the teeth 292 of the gear 288 the valve 306 is moved to the position illustrated in FIG. 5 so that fluid pressure in the cylinder 300 is exhausted to the reservoir 130. When the lever 294 is adjusted to couple the clutch element 290 to the teeth 292 of the gear 288 the valve 306 interconnects the fluid lines 308 and 310 so that fluid pressure from the pump is routed to the cylinder 300. The fluid pressure in the cylinder 300 acting on the piston 304 causes the rod 302 to move inwardly against the end of the valve element 108 to move the valve element 108 to its inner position wherein it routes fluid pressure to the inner end of the piston 98 and exhausts fluid pressure from the inner end of the piston 90 so that the first section of the transmission 42 is conditioned for direct drive. In this manner, whenever the power take-off is engaged by coupling the clutch element 290 to the teeth 292 of the gear 288 the first transmission section 42 will be shifted to and/or held in its direct drive condition so that the power take-off shaft 298 is driven at the proper speed.

Having thus described the preferred embodiment of the invention, various modifications within the spirit and scope of the invention will become apparent to those skilled in the art and can be made without departing from the underlying principles of the invention.

Therefore, the invention should not be limited to the specific illustration and description, but only by the following claims.

We claim:

1. A tractor including a wheel supported chassis, an engine supported on the chassis, variable ratio transmission means supported on the chassis and coupling the engine to at least a pair of wheels, operator control means for varying the ratio of the transmission means, a PTO shaft supported on the chassis, and means including clutch means coupling the PTO shaft to the engine, characterized in that the variable ratio transmission means includes a first section having first and second ratio conditions and a second section having a plurality of ratio conditions, the means coupling the PTO shaft to the engine is coupled to the transmission means between the first and second sections, and the tractor further includes means responsive to engagement of the clutch means to override the operator control means and shift the first section to and/or hold the first section in its first ratio condition.

2. A tractor as set forth in claim 1 wherein the first section of the transmission means includes first and second pressure responsive hydraulic actuators for shifting the first section of the transmission to its first and second ratio conditions, respectively, and valve means having first and second opposed servo areas responsive to fluid pressure to shift the valve means to first and second positions, respectively, in which it connects the first and second actuator means, respectively, to a source of fluid pressure, the manual control means includes valve means manually shiftable to alternately connect the first and second servo areas to the source of fluid pressure, and the override means includes means for biasing the first mentioned valve means in opposition to any force provided by fluid pressure acting on the second servo area.

3. A tractor as set forth in claim 2 wherein the means biasing the first mentioned valve means includes servo means responsive to fluid pressure to bias the valve means towards its first position with a force greater than the force exerted by fluid pressure acting on the second servo area, and the override means further includes additional valve means shiftable with means for engaging the clutch means to connect the servo means with the source of fluid pressure the clutch means is engaged and to connect the servo means with the fluid reservoir when the clutch is disengaged.

4. An articulated tractor comprising: front and rear frame structures pivotally connected for articulation about a generally upright axis and each supported on a pair of wheels; an engine mounted on the front frame structure; a first change-speed transmission section having first and second ratio conditions mounted on the front frame structure and having an input coupled to the engine and an output; a second change-speed transmission section having a plurality of ratio conditions mounted on the rear frame structure and having an input and an output coupled to at least a pair of the wheels; a gearbox mounted on the rear frame structure having an input and an output coupled to the second transmission section input and to the gearbox input through power transfer means; drive shaft means coupling the first transmission section output and the gearbox input; control means for shifting the first transmission section between its first and second ratio conditions and for shifting the second transmission section between its plurality of ratio conditions; a PTO shaft journaled in the rear frame structure; means including clutch means coupling the PTO shaft to the power transfer means; and override means responsive to engagement of the clutch means to override the control means to shift the first transmission section to and/or hold the first transmission section in its first ratio condition.

5. An articulated tractor as set forth in claim 4 wherein the first transmission section includes first and second hydraulic actuator means responsive to fluid pressure to shift the first transmission sections to its first and second, respectively, ratio conditions, the control means for the first transmission section includes valve means having first and second opposed servo means responsive to fluid pressure to respectively shift the valve means between first and second positions in which it connects the first and second actuator means respectively to a source of fluid pressure, and a manually shiftable valve means alternately connecting the first and second servo means to the source of fluid pressure, and the override means includes means for biasing the valve means in opposition to any force provided by fluid pressure acting on the second servo means.

6. An articulated tractor as set forth in claim 5 wherein the means for biasing the valve means in opposition to any force provided by fluid pressure acting on the second servo means includes a third servo means, and the override means further includes a valve means shiftable with means for engaging the clutch to connect the third servo means with the source of fluid pressure when the clutch means is engaged.

7. An articulated tractor as set forth in claim 6 wherein the valve means having first and second opposed servo means includes a valve spool axially shiftable in a valve bore having closed ends which form, in conjunction with the end of the spool, the first and second servo means, and the third servo means includes a rod extending through one end of the bore for reciprocal movement and for engagement with one end of the spool, and a piston operatively associated with the rod and slidably mounted in a closed end cylinder.

8. An articulated tractor as set forth in claim 7 wherein the first, second, and third servo means are all subjected to the same fluid pressure and the piston has a larger cross-section area than the spool.

* * * * *